W. H. TODD.
DIRECTION INDICATOR FOR MOTOR CARS.
APPLICATION FILED OCT. 6, 1917.
1,317,740. Patented Oct. 7, 1919.
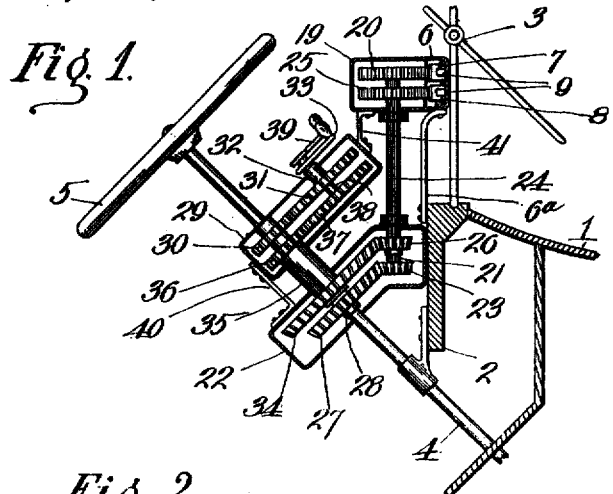
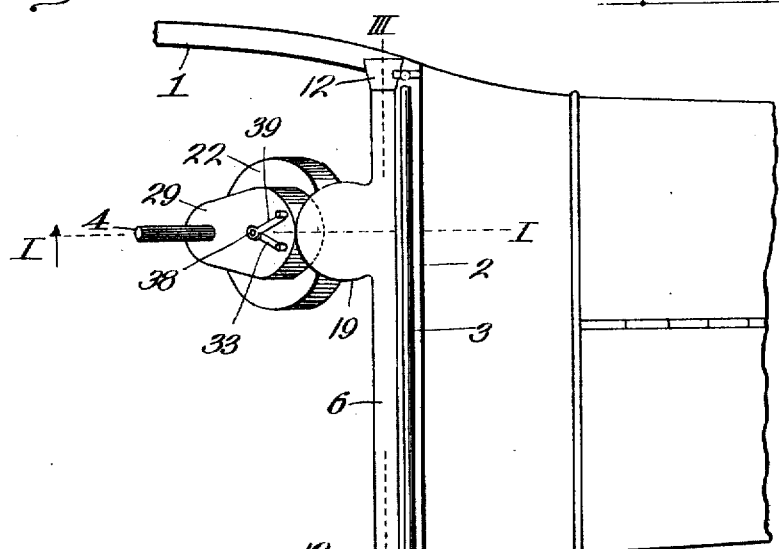
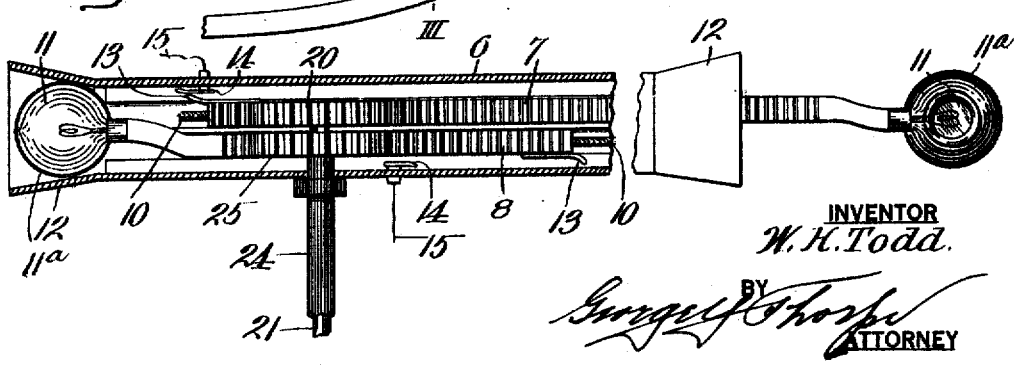
INVENTOR
W. H. Todd.
BY
ATTORNEY

UNITED STATES PATENT OFFICE.

WILLIAM H. TODD, OF KANSAS CITY, MISSOURI.

DIRECTION-INDICATOR FOR MOTOR-CARS.

1,317,740.     Specification of Letters Patent.     Patented Oct. 7, 1919.

Application filed October 8, 1917. Serial No. 195,180.

*To all whom it may concern:*

Be it known that I, WILLIAM H. TODD, a citizen of the United States of America, and resident of Kansas City, in the county of Jackson, State of Missouri, having invented certain new and useful Improvements in Direction-Indicators for Motor-Cars, do hereby declare that the following is a full, clear, and exact description of the same.

This invention relates to direction indicators for motor cars for apprising pedestrians and the drivers of cars following or approaching cars equipped with the indicators that the latter are about to stop or make a turn to the right or left, and my object is to produce a simple, strong, durable and inexpensive safety equipment which can be built into the car or which can be readily and economically applied thereto at any time.

With this object in view, the invention consists in certain novel and peculiar features of construction and combinations of parts as hereinafter described and claimed; and in order that it may be fully understood reference is to be had to the accompanying drawing, in which:—

Figure 1, is a vertical section of a part of a motor car equipped with my invention, the section being on the line I—I, of Fig. 2.

Fig. 2, is a top plan of a part of the car as equipped in Fig. 1.

Fig. 3, is an enlarged vertical section on the line III—III, of Fig. 2.

Fig. 4, is a diagrammatic view illustrative of the wiring for the lamps.

Referring now to the construction in detail, 1 indicates a motor car of any approved type, 2 the dash, 3 the wind shield, 4 the steering shaft and 5 the steering wheel of the car, and extending across the car at a suitable point, in this instance back of the lower part of the wind shield, is a long and narrow box or housing 6, shown as supported from the dash by uprights 6ª of which only one appears.

Suitably supported for longitudinal sliding movement within the housing 6, is a pair of rack bars 7 and 8, preferably of channeled construction as at 9, for the accommodation of insulated wires 10, connected to one terminal of the respective lamps 11, suitably secured on the outer ends of said bars and normally withdrawn into protecting hoods or ends 12 of the housing. The bars are also shown as provided with individual lamp housings 11ª for protecting the lamps when projected to operative position, as hereinafter referred to.

The bars, in the construction shown, are in circuit with the lamps, and are provided with spring terminals or contacts 13, for engagement with contacts 14, carried by and suitably insulated from the housing 6, when the respective lamps are projected to operative position, this relation of parts as regards one of the lamps being shown in Fig. 3. The contacts 14, are connected by wires 15, to feed wire 16, of the electric lighting circuit of the car, and the other wire of said circuit 17, is connected by wires 18 to the wires 10. It will thus be seen that when the lamps are withdrawn the circuits are broken and that when projected, the circuits are completed.

The housing 6 is formed opposite the steering shaft, with an enlargement 19, for the accommodation of a gear wheel 20, intermeshed with the rack bar 7, and mounted on the upper end of a shaft 21, journaled in said enlargement and in a casing 22, secured to the dash 2, and equipped within said casing with a gear wheel 23. A tubular shaft 24, incloses shaft 21 for nearly the full length thereof and carries a gear wheel 25, meshing with rack bar 8, and a small gear wheel 26.

The gear wheel 23 meshes with a larger gear wheel 27, mounted on a tubular shaft 28, extending from casing 22 to a casing 29, and within the latter carries a gear wheel 30, meshing with a gear wheel 31, on a short tubular shaft 32, journaled in and projecting from the casing 29 and equipped at its upper end with an operating handle 33, whereby, through the gearing described, the rack bar 7 can be adjusted to project its lamp beyond the adjacent side of the car where it can be readily seen.

A large gear wheel 34, is secured on the lower end of shaft 35, journaled on shaft 28 and in the casings 22 and 29, and said gear engages the gear wheel 26. On the upper end of shaft 35 is secured a gear wheel 36, meshing with a gear wheel 37, on the lower end of a shaft 38, journaled in shaft 32 and equipped at its upper end with an operating handle 39, whereby the rack bar 8 is adjusted to dispose its lamp beyond the car at the opposite side thereof from the lamp carried by bar 7, and for the same reason, it being understood that when a lamp is set beyond its respective side of the car, it is intended as a signal that the car will be turned in a corresponding direction or be brought to a state of rest, and it will also be understood that when a lamp is set for signaling purposes, the circuit therethrough will be completed so that the lamp can be seen at night.

The casing 29 can be supported in any suitable manner. For convenience it is shown as supported on brackets 40 and 41, projecting respectively from casings 22 and 19.

From the above description it will be seen that I have produced a direction indicator for motor cars, which embodies the features of advantage enumerated as desirable in the statement of the object of invention, and while I have illustrated and described the preferred embodiment, it is to be understood that I reserve the right to make such changes as properly fall within the spirit and scope of the appended claim.

I claim:

A direction indicator for motor cars, comprising a housing extending across a car, a pair of rack bars slidingly arranged within said housing, a pair of gear wheels engaging said rack bars respectively and disposed within the housing, a housing underlying the first-named housing, a pair of concentrically arranged shafts extending from one housing to the other and carrying said gear wheels respectively, a second pair of gear wheels on said shafts respectively and located within said second housing, a third housing above the said second housing, a pair of concentrically arranged shafts extending from the said second housing to the said third housing, a pair of gear wheels on the lower ends of said last-named pair of shafts and within said second housing and meshing with said second pair of gear wheels, a pair of gear wheels within the said third housing and respectively secured on the shafts projecting therein, a pair of gear wheels meshing with the said pair of gear wheels within the third housing and also located in the latter, a pair of shafts for the second pair of gear wheels in the third housing, and handles for said shafts respectively.

Signed at Kansas City, in the county of Jackson and State of Missouri, this 4th day of October, 1917.

WILLIAM H. TODD.

Copies of this patent may be obtained for five cents each, by addressing the "Commissioner of Patents, Washington, D. C."